(12) United States Patent
Reiter et al.

(10) Patent No.: US 7,004,488 B2
(45) Date of Patent: Feb. 28, 2006

(54) SELF-ALIGNING HITCH ASSEMBLY

(75) Inventors: William P. Reiter, Dickinson, ND (US); Dean A. Kovash, Manning, ND (US)

(73) Assignee: New Design Corporation, Inc., Dickinson, ND (US)

( * ) Notice: Subject to any disclaimer, the term of this patent is extended or adjusted under 35 U.S.C. 154(b) by 0 days.

(21) Appl. No.: 10/365,683

(22) Filed: Feb. 12, 2003

(65) Prior Publication Data

US 2003/0178810 A1    Sep. 25, 2003

Related U.S. Application Data

(60) Provisional application No. 60/356,904, filed on Feb. 12, 2002.

(51) Int. Cl.
*B60D 1/00*    (2006.01)
(52) U.S. Cl. ..................... 280/477; 280/515
(58) Field of Classification Search .............. 280/477, 280/515
See application file for complete search history.

(56) References Cited

U.S. PATENT DOCUMENTS

| | | | |
|---|---|---|---|
| 2,048,310 A | * | 7/1936 | Wohldorf ................ 280/477 |
| 2,826,432 A | * | 3/1958 | Clever ................... 280/477 |
| 3,744,819 A | * | 7/1973 | Cook et al. ............. 280/477 |
| 3,783,982 A | * | 1/1974 | Wells ................... 188/112 R |
| 3,892,296 A | * | 7/1975 | DePuydt et al. ........ 188/112 R |
| 4,131,295 A | | 12/1978 | Highberger |
| 4,225,149 A | | 9/1980 | Koopman |
| 4,350,362 A | | 9/1982 | Landers |
| 4,417,748 A | | 11/1983 | Dortch |
| 4,792,151 A | | 12/1988 | Feld |
| 4,844,497 A | | 7/1989 | Allen |
| 4,871,185 A | | 10/1989 | Chakroff et al. |
| 4,953,883 A | | 9/1990 | Helie |
| 4,998,745 A | | 3/1991 | David |
| 5,080,386 A | | 1/1992 | Lazar |
| 5,114,170 A | | 5/1992 | Lanni et al. |
| 5,161,815 A | | 11/1992 | Penor, Jr. |
| 5,193,838 A | * | 3/1993 | Olson ................... 280/515 |
| 5,236,215 A | | 8/1993 | Wylie |
| 5,503,422 A | | 4/1996 | Austin |
| 5,516,139 A | | 5/1996 | Woods |
| 5,529,330 A | | 6/1996 | Roman |
| 5,758,893 A | | 6/1998 | Schultz |
| 5,769,443 A | | 6/1998 | Muzny |
| 5,769,559 A | | 6/1998 | Olson |
| 5,797,616 A | | 8/1998 | Clement |
| 5,909,892 A | | 6/1999 | Richardson |
| 5,927,742 A | | 7/1999 | Draper |
| 5,941,551 A | | 8/1999 | Harman et al. |

(Continued)

*Primary Examiner*—Lesley D. Morris
*Assistant Examiner*—Paul Royal, Jr.
(74) *Attorney, Agent, or Firm*—Mueting, Raasch & Gebhardt, P.A.

(57) ABSTRACT

Apparatus and methods for hitching and unhitching of trailers or other towed devices are disclosed. The hitch assemblies may include alignment features to correct for errors in alignment of the hitch and trailer tongue during the hitching process. The hitch assemblies may compensate for vertical as well as horizontal misalignment. In addition, the hitch assemblies may include automated capture and release of the tongue on the hitch. The hitch assemblies may also disengage integral braking systems that are present on the trailer during the hitching process and re-engage the brakes after unhitching. All of these operations may be accomplished without requiring the driver of the towing vehicle to leave the driving position.

17 Claims, 4 Drawing Sheets

U.S. PATENT DOCUMENTS

| | | |
|---|---|---|
| 5,997,025 A | 12/1999 | Wisecarver |
| 6,027,134 A * | 2/2000 | Hart et al. ............... 280/491.2 |
| 6,164,681 A | 12/2000 | Grammer |
| 6,224,084 B1 | 5/2001 | Ray et al. |
| 6,234,510 B1 | 5/2001 | Hammons |
| 6,264,228 B1 * | 7/2001 | Westervelt .................. 280/428 |
| 6,328,326 B1 | 12/2001 | Slatten |
| 6,428,030 B1 | 8/2002 | Melesko et al. |
| 6,446,999 B1 | 9/2002 | Davis, Jr. |
| 6,494,477 B1 | 12/2002 | Parker |

\* cited by examiner

SELF-ALIGNING HITCH ASSEMBLY

RELATED APPLICATIONS

This application claims the benefit under 35 U.S.C. § 119 of U.S. Provisional Patent Application No. 60/356,904 filed on 12 Feb. 2002, which is hereby incorporated by reference in its entirety.

FIELD OF THE INVENTION

The present invention relates to the field of self-aligning and self securing hitch assemblies.

BACKGROUND

The hitching and unhitching of trailers or other towed devices presents problems for drivers of the towing vehicles. In most instances, the drivers must mount and dismount the towing vehicle during each hook-up procedure to view the alignment of the hitch and tongue several times during the process. The problems may be exacerbated when the towed vehicles incorporate brakes that must be disengaged after the tongue on the towed device is secured to the hitch of the towing vehicle. Disengagement of the brake may require the driver to dismount the towing vehicle one additional time before proceeding with the trailer.

Unhitching of trailers or other towed devices often also requires that the driver dismount the towing vehicle one last time to disengage the tongue from the hitch. In addition, the driver may also be required to set the brakes on trailers that include integral brake systems to prevent unwanted movement of the unhitched trailer.

Among the problems caused by these operations is the amount of time spent aligning the hitch and the trailer tongue to hitch the trailer to the towing vehicle. Misalignment may require the operator to position the towing vehicle numerous times during the process. The time spent obtaining the proper alignment may be significant relative to the time required to actually move the trailer to a desired location.

Alternatively, the driver may be tempted to try to move the trailer into alignment with the towing vehicle, leading to the potential of physical injury for the driver. And in some instances, movement of the trailer may be hindered if the trailer includes an integral braking system designed to disengage the brakes only when the trailer is properly hitched.

In addition to the lost time spent during alignment, all of these operations, i.e., mounting, dismounting, hitching, unhitching, etc. present the potential for injury to the driver.

SUMMARY OF THE INVENTION

The present invention provides apparatus and methods for hitching and unhitching of trailers or other towed devices. The apparatus includes alignment features designed to correct for errors in alignment of the hitch and trailer tongue during the hitching process. It is preferred that the apparatus compensate for vertical as well as horizontal misalignment. In addition, the apparatus includes automated capture and release of the tongue on the hitch.

In some aspects, the apparatus may also disengage integral braking systems that are present on the trailer during the hitching process and re-engage the brakes after unhitching.

Preferably, all of these operations can be accomplished without requiring the driver of the towing vehicle to leave the driving position.

The hitch assemblies of the present invention may include a tongue guide including a ramp to for vertical alignment of a tongue attached to a towed device and an edge guide for horizontal alignment of the tongue; a tongue capture assembly including for capturing the tongue in connection with the hitch assembly; and a brake release actuator disengaging brakes on the towed device when the tongue capture assembly has captured a tongue.

The invention may also include methods of using and operating the hitch assemblies to capture and release tongues of towed devices. Those methods may also include disengagement and engagement of integral brakes in addition to capture and release of tongues.

In some embodiments, the tongue guide may be resiliently mounted to the towing vehicle such that it is biased in a center position, but can deflect horizontally to compensate for misalignment of a tongue. The deflection may be in the form of, e.g., rotating of the tongue guide.

It should be understood that the tongue capture assembly may be remotely actuated such that an operator can actuate capture of the tongue without directly physically manipulating the capture assembly. It may be preferred that the capture assembly be biased in the capture position, such that a power failure retains a towed vehicle in connection with the hitch assembly. If the tongue includes an eye, the capture assembly may be provided in the form of a plunger, hook or other capture element.

It should also be understood that the brake release actuator may be optional, i.e., some hitch assemblies may not include a brake release actuator. In some hitch assemblies that do include a brake release actuator, it may be operatively coupled to the capture assembly such that capture of the tongue also results in disengagement of any brakes on the towed device by the brake release actuator.

It may be further preferred that any brake release actuator provided in connection with the hitch assemblies of the present invention also provide for re-engagement of the brakes on the towed device when the capture assembly releases the tongue of the towed device.

In one aspect, the present invention provides a hitch assembly having a tongue guide with a ramp for vertical alignment of a tongue on a towed device; a capture element positioned proximate the tongue guide, wherein the hitch assembly is closed when the capture element mates with the tongue; and a brake release actuator operable to disengage a brake on the towed device when the capture element mates with the tongue such that the hitch assembly is closed.

The hitch assembly may be movable between an open position in which the tongue and the capture element are not mated and the closed position in which the capture element mates with the tongue. In some embodiments, the brake release actuator does not disengage the brake on the towed vehicle when the hitch assembly is in the open position.

The invention may include an actuator operably attached to the capture element, the actuator moving the capture element and the tongue relative to each other to mate the capture element and the tongue. With such an actuator, the hitch assembly may include a remote switch located proximate a driver's seat on a towing vehicle, the remote switch operably connected to the actuator to actuate the actuator, wherein a driver in the driver's seat can operate the remote switch.

In some embodiments, the tongue guide may include an edge guide for horizontal alignment of the tongue relative to the hitch assembly. The tongue guide may be resiliently mounted for rotation in a horizontal plane, and wherein the tongue guide is biased in a center position.

In another aspect, the present invention may provide a hitch assembly including a tongue guide with a ramp for vertical alignment of a tongue on a towed device and an edge guide for horizontal alignment of the tongue, wherein the tongue guide is resiliently mounted for rotation in a horizontal plane, and wherein the tongue guide is biased in a center position; a capture element positioned proximate the tongue guide, wherein the hitch assembly is movable between an open position in which the tongue and the capture element are not mated and a closed position in which the capture element mates with the tongue. The hitch assembly may further include an actuator operably attached to the capture element, the actuator moving the capture element and the tongue relative to each other to move the hitch assembly between the open position and the closed position; and a remote switch located proximate a driver's position on a towing vehicle, the remote switch operably connected to the actuator to actuate the actuator, wherein a driver in the driver's seat can operate the remote switch.

The hitch assembly may include a brake release actuator operable to disengage a brake on the towed device when the hitch assembly is in the closed position, and wherein the brake release actuator does not disengage the brake on the towed vehicle when the hitch assembly is in the open position.

In another aspect, the present invention provides a method of hitching a towing vehicle to a towed device. The method includes providing a hitch on a towing vehicle, the hitch having a tongue guide that includes a ramp for vertical alignment of a tongue on a towed device, a capture element positioned proximate the tongue guide, and an actuator operably connected to the capture element. The method further includes driving the towing vehicle such that the tongue on the towed device is located proximate the capture element; and operating the actuator from a driver's position on the towing vehicle to move the capture element to capture the tongue after locating the tongue proximate the capture element.

The methods of the present invention may include guiding the tongue using the tongue guide to locate the tongue proximate the capture element.

Operating the actuator may also result in disengaging a brake on the towed device after the capture element captures the tongue. After operating the actuator to move the capture element to capture the tongue, the methods may include unhitching the towed device by operating the actuator from the driver's position to release the tongue from the capture element. Operating the actuator to perform the unhitching may engage a brake on the towed device.

In the methods in which the tongue guide is resiliently mounted for rotation in a horizontal plane, the methods of the invention may include biasing the tongue guide in a center position.

In another aspect, the present invention may provide a method of hitching a towing vehicle to a towed device. The method may include providing a hitch on a towing vehicle, the hitch having a tongue guide with a ramp for vertical alignment of a tongue on a towed device, a capture element positioned proximate the tongue guide, and an actuator operably connected to the capture element. The method may further include driving the towing vehicle such that the tongue on the towed device is located proximate the capture element; guiding the tongue using the tongue guide; operating the actuator from a driver's position on the towing vehicle to move the capture element to capture the tongue after locating the tongue proximate the capture element. The method may also include disengaging a brake on the towed device after the capture element captures the tongue. The method may further include unhitching the towed device, after operating the actuator to move the capture element to capture the tongue, by operating the actuator from the driver's position to release the tongue from the capture element. The unhitching may engage a brake on the towed device when the tongue is released from the capture element.

DESCRIPTION OF ONE ILLUSTRATIVE EMBODIMENT OF THE INVENTION

Figure 1:
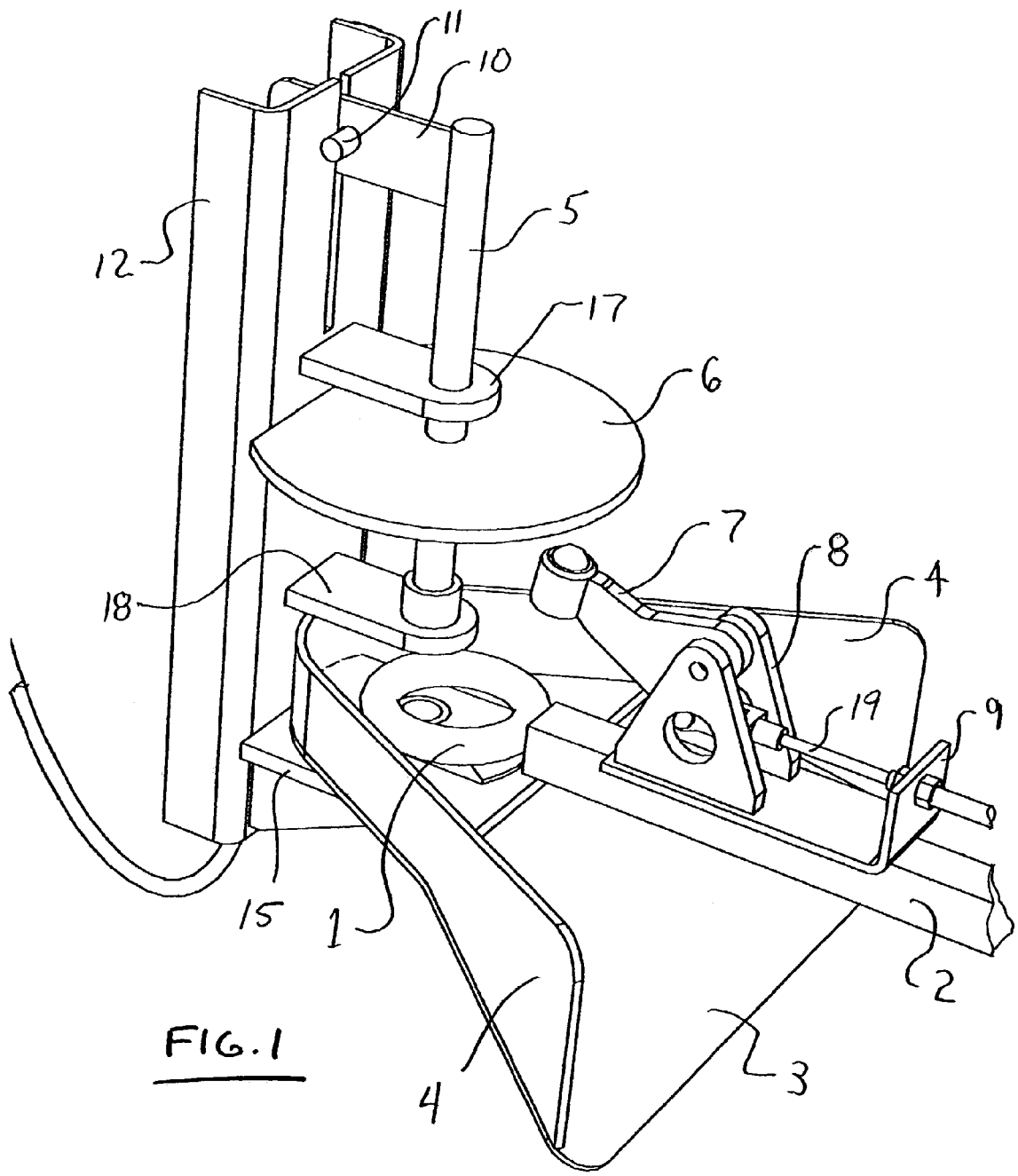
FIG. 1 is top front left perspective view of one hitch assembly according to the present invention, with a tongue 2 in position for capture, but before the plunger 5 is activated to capture the eye 1.
Figure 2:
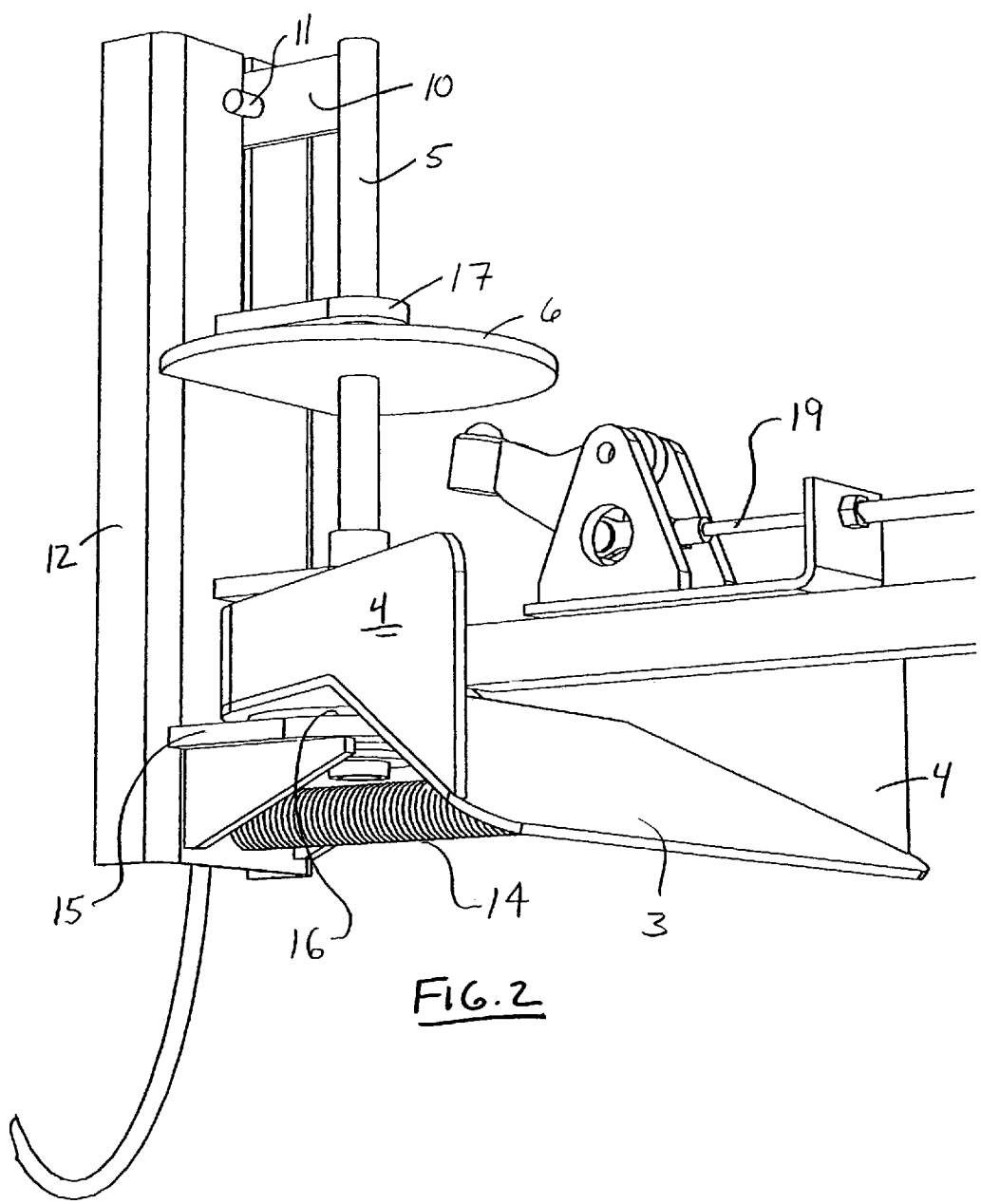
FIG. 2 is a lower left perspective view of the hitch assembly of FIG. 1.
Figure 3:
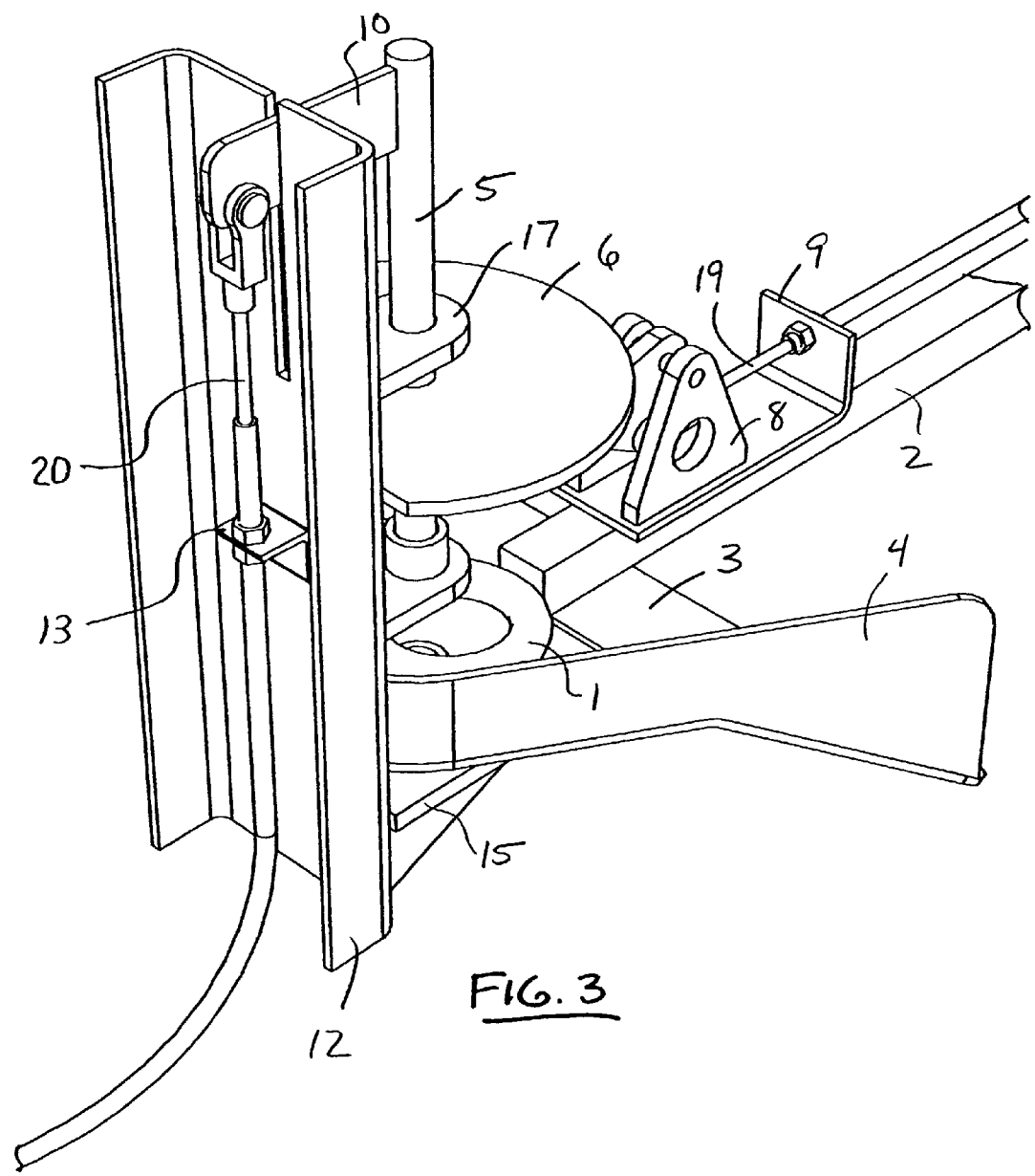
FIG. 3 is a top back left perspective view of the hitch assembly of FIG. 1.

The following description of one illustrative embodiment of the present invention is not intended to limit the scope of the invention. It will be understood that many substantially equivalent arrangements and/or components may be substituted for those depicted in connection with this one illustrative embodiment.

The following parts of the illustrative hitch assembly may be found in the figures:

| Part No. | Part Name |
| --- | --- |
| 1 | Tongue Eye |
| 2 | Trailer Tongue |
| 3 | Ramp |
| 4 | Edge Guide |
| 5 | Plunger |
| 6 | Plunger Plate |
| 7 | Brake Arm |
| 8 | Mount Brackets |
| 9 | Brake Cable Mount |
| 10 | Plunger cable Attachment |
| 11 | Dowel |
| 12 | Main Frame |
| 13 | Control Cable Mount |
| 14 | Alignment Spring |
| 15 | Base Plate |
| 16 | Thrust Washer |
| 17 | Guide Plate |
| 18 | Guide Plate with Bushing |
| 19 | Trailer Brake Cable |
| 20 | Control Cable |

Initial setup would involve the installation of the hitch assembly onto the towing vehicle so the lowest edge of the ramp is at a predetermined elevation. The trailer tongue, while disconnected from the towing vehicle will need to be positioned so the bottom surface of the tongue eye is, e.g., approximately 1" above the ramp edge elevation. This could be achieved by a chain or any other suitable device which will not restrict necessary articulation while towing. The trailer brakes may be set by spring tension or some other biasing structure such as pistons, leaf springs, elastomeric materials, etc. while the trailer is disconnected from a towing vehicle. The tongue can be folded up for storage if required.

With the initial setup complete, the trailer hook up procedure would be as follows. The entire hook up and disconnect sequence of tow vehicle to trailer may, in some instances, preferably be accomplished without the need for the operator to dismount from the tow vehicle.

Assuming the trailer tongue is down, and the position of the trailer tongue is at a point behind the towing vehicle. The operator will proceed to back the tow vehicle in the direction of the trailer tongue. The alignment of tow vehicle and tongue does not need to be perfect. As the lower edge of the ramp (3) engages the tongue eye (1) it will guide the eye vertically while the optional edge guide (4) centers the tongue eye horizontally. The operator may, e.g., know when the tongue eye has reached the end of the ramp as they may feel a slight bump and notice the trailer move slightly. In the illustrative embodiment, the trailer brakes are locked by spring tension at this time so it cannot roll away from the tow vehicle.

At this point the operator actuates the plunger (5) and plunger plate assembly (6) This can be accomplished by a manual lever trip, electric linear actuator or any other suitable technique. As the plunger moves down, it first captures the tongue eye (1).

Figure 4:
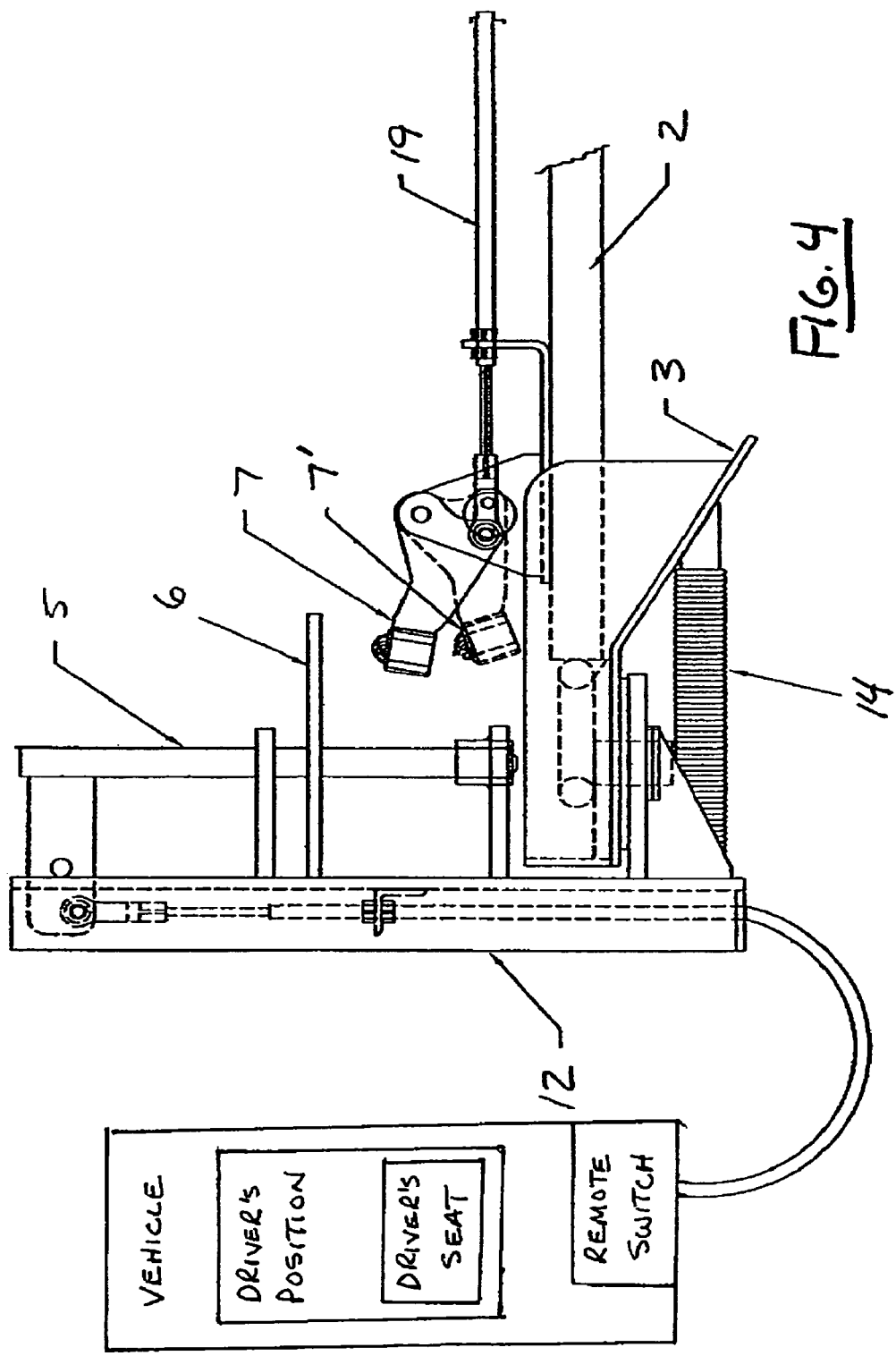
FIG. 4 is a left side elevation view of the hitch assembly of FIG. 1.

As downward travel continues, the plunger plate (6) makes contact with the brake arm (7). The brake arm is supported by the mount brackets (8). As the plunger plate (6) pushes against the brake arm (7), the brake arm pivots. This pivoting is depicted in FIG. 4 in which the brake arm (7) is depicted in one position in solid lines in which the brakes on the towed device are engaged. An alternate position for brake arm (7') is also depicted in FIG. 4 in which the brakes on the towed device would be disengaged. The pivoting action is used to apply rearward force to the trailer brake cable (19) with sufficient force to override the springs holding the brake shoes against the trailer tires. At this point (see, e.g., brake arm 7'), brakes are released and towing can commence.

It will be understood that the plunger plate (6) and brake arm (7) are only one illustrative embodiment of brake release actuator that may be supplied in connection with the present invention. Many other structures could be provided in place of those used in the illustrative embodiment.

While in tow, the trailer tongue is preferably allowed full articulation because the ramp/edge guide assembly is preferably able to swivel atop the thrust washer (16) and base plate (15). The alignment spring (14) serves to bias the ramp and edge guide assembly to a centered position after the trailer is disconnected and hold the ramp centered during the next hook up sequence. It will be understood that although a coil spring is used in the illustrative embodiment, many other biasing structures may be used, e.g., pistons, elastomeric bushings, leaf springs, torsion springs, etc.

The operator can preferably disconnect or unhitch the trailer from the seat or driver's position of the tow vehicle. To unhitch the trailer or towed device, the operator simply reverses the actuator which now raises the plunger/plunger plate assembly. As the assembly rises, brake cable tension is released and brake spring tension engages the trailer brakes. It may be preferred that the brakes re-engage before the plunger is clear of the tongue eye. As the plunger continues to rise, the eye is released, and the tow vehicle can drive forward until the ramp is clear of the trailer tongue.

Various modifications and alterations of the present invention other than those described above will be apparent to those skilled in the art without departing from the scope of this invention, and it should be understood that this invention is not limited to the illustrative embodiment set forth herein.

What is claimed is:

1. A hitch assembly comprising:
   a tongue guide comprising a ramp for vertical alignment of a tongue on a towed device;
   a capture element positioned proximate the tongue guide, wherein the hitch assembly is closed when the capture element mates with the tongue; and
   a brake release actuator operable to disengage a brake on the towed device when the capture element mates with the tongue such that the hitch assembly is closed.

2. An assembly according to claim 1, wherein the hitch assembly is movable between an open position in which the tongue and the capture element are not mated and the closed position in which the capture element mates with the tongue.

3. An assembly according to claim 2, wherein the brake release actuator does not disengage the brake on the towed vehicle when the hitch assembly is in the open position.

4. An assembly according to claim 1, further comprising a capture actuator operably attached to the capture element, the capture actuator moving the capture element and the tongue relative to each other to mate the capture element and the tongue.

5. An assembly according to claim 1, further comprising:
   a capture actuator operably attached to the capture element, the capture actuator moving the capture element and the tongue relative to each other to mate the capture element and the tongue; and
   a remote switch located proximate a driver's seat on a towing vehicle, the remote switch operably connected to the capture actuator to actuate the capture actuator, wherein a driver in the driver's seat can operate the remote switch.

6. An assembly according to claim 1, wherein the tongue guide comprises an edge guide for horizontal alignment of the tongue relative to the hitch assembly.

7. An assembly according to claim 6, wherein the tongue guide is resiliently mounted for rotation in a horizontal plane, and wherein the tongue guide is biased in a center position.

8. An assembly according to claim 1, wherein the capture element comprises a plunger.

9. A method of hitching a towing vehicle to a towed device, the method comprising:
   providing a hitch on a towing vehicle, the hitch comprising a tongue guide that comprises a ramp for vertical alignment of a tongue on a towed device, a capture element positioned proximate the tongue guide, and a capture actuator operably connected to the capture element;
   driving the towing vehicle such that the tongue on the towed device is located proximate the capture element; and
   operating the capture actuator from a driver's position on the towing vehicle to move the capture element to capture the tongue after locating the tongue proximate the capture element;
   wherein, after operating the capture actuator to move the capture element to capture the tongue, the method further comprises unhitching the towed device by operating the capture actuator from the driver's position to release the tongue from the capture element;
   and wherein operating the capture actuator to perform the unhitching engages a brake on the towed device.

10. A hitch assembly comprising:

a tongue guide comprising a ramp for vertical alignment of a tongue on a towed device and an edge guide for horizontal alignment of the tongue, wherein the tongue guide is resiliently mounted for rotation in a horizontal plane, and wherein the tongue guide is biased in a center position;

a capture element positioned proximate the tongue guide, wherein the hitch assembly is movable between an open position in which the tongue and the capture element are not mated and a closed position in which the capture element mates with the tongue;

a capture actuator operably attached to the capture element, the capture actuator moving the capture element and the tongue relative to each other to move the hitch assembly between the open position and the closed position;

a remote switch located proximate a driver's position on a towing vehicle, the remote switch operably connected to the actuator to actuate the actuator, wherein a driver in the driver's seat can operate the remote switch; and a brake release actuator operable to disengage a brake on the towed device when the hitch assembly is in the closed position, and wherein the brake release actuator does not disengage the brake on the towed vehicle when the hitch assembly is in the open position.

11. A method of hitching a towing vehicle to a towed device, the method comprising:

providing a hitch on a towing vehicle, the hitch comprising a tongue guide that comprises a ramp for vertical alignment of a tongue on a towed device, a capture element positioned proximate the tongue guide, and a capture actuator operably connected to the capture element;

driving the towing vehicle such that the tongue on the towed device is located proximate the capture element;

guiding the tongue using the tongue guide;

operating the capture actuator from a driver's position on the towing vehicle to move the capture element to capture the tongue after locating the tongue proximate the capture element;

disengaging a brake on the towed device after the capture element captures the tongue;

unhitching the towed device, after operating the capture actuator to move the capture element to capture the tongue, by operating the capture actuator from the driver's position to release the tongue from the capture element; and wherein the unhitching further engages a brake on the towed device when the tongue is released from the capture element.

12. A method of hitching a towing vehicle to a towed device, the method comprising:

providing a hitch on a towing vehicle, the hitch comprising a tongue guide that comprises a ramp for vertical alignment of a tongue on a towed device, a capture element positioned proximate the tongue guide, and a capture actuator operably connected to the capture element;

driving the towing vehicle such that the tongue on the towed device is located proximate the capture element; and operating the capture actuator from a driver's position on the towing vehicle to move the capture element to capture the tongue after locating the tongue proximate the capture element, and wherein operating the actuator further comprises disengaging a brake on the towed device after the capture element captures the tongue.

13. A method according to claim 12, further comprising guiding the tongue using the tongue guide to locate the tongue proximate the capture element.

14. A method according to claim 12, wherein the tongue comprises a tongue eye.

15. A method according to claim 12, wherein, after operating the capture actuator to move the capture element to capture the tongue, the method further comprises unhitching the towed device by operating the capture actuator from the driver's position to release the tongue from the capture element.

16. A method according to claim 12, wherein the tongue guide comprises an edge guide for horizontal alignment of the tongue relative to the hitch assembly.

17. A method according to claim 16, wherein the tongue guide is resiliently mounted for rotation in a horizontal plane, and wherein the method comprises biasing the tongue guide in a center position.

* * * * *